United States Patent
Eliáš et al.

(10) Patent No.: US 9,189,206 B2
(45) Date of Patent: Nov. 17, 2015

(54) SYSTEM AND METHOD FOR MANAGING IMMUTABLE OBJECTS

(71) Applicant: Red Hat, Inc., Raleigh, NC (US)

(72) Inventors: Filip Eliáš, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 229 days.

(21) Appl. No.: 13/899,294

(22) Filed: May 21, 2013

(65) Prior Publication Data

US 2014/0351789 A1    Nov. 27, 2014

(51) Int. Cl.
*G06F 9/44* (2006.01)
*G06F 9/455* (2006.01)

(52) U.S. Cl.
CPC .. *G06F 8/24* (2013.01); *G06F 8/20* (2013.01); *G06F 9/45504* (2013.01)

(58) Field of Classification Search
None
See application file for complete search history.

(56) References Cited

U.S. PATENT DOCUMENTS

| | | | |
|---|---|---|---|
| 5,615,351 A * | 3/1997 | Loeb | 700/90 |
| 6,434,595 B1 * | 8/2002 | Suzuki et al. | 709/202 |
| 6,438,560 B1 | 8/2002 | Loen | |
| 6,925,638 B1 | 8/2005 | Koved et al. | |
| 7,114,152 B2 | 9/2006 | Hogstrom et al. | |
| 7,363,539 B1 * | 4/2008 | Mitrov | 714/18 |
| 7,890,929 B1 * | 2/2011 | Johanson | 717/114 |
| 8,156,085 B2 | 4/2012 | Dominguez, Jr. et al. | |
| 8,281,293 B2 | 10/2012 | Fulton et al. | |
| 2002/0073396 A1 * | 6/2002 | Crupi et al. | 717/104 |
| 2002/0104068 A1 * | 8/2002 | Barrett et al. | 717/104 |
| 2003/0056022 A1 * | 3/2003 | Carlson et al. | 709/315 |
| 2003/0131348 A1 * | 7/2003 | Hogstrom et al. | 717/166 |
| 2005/0091575 A1 * | 4/2005 | Relyea et al. | 715/502 |
| 2008/0147955 A1 * | 6/2008 | Lagergren et al. | 711/6 |
| 2008/0288917 A1 * | 11/2008 | Lee et al. | 717/105 |
| 2009/0138850 A1 * | 5/2009 | Yamaoka | 717/116 |
| 2009/0150864 A1 * | 6/2009 | Meijer et al. | 717/116 |

(Continued)

OTHER PUBLICATIONS

Porat et al., "Automatic detection of immutable fields in Java," 2000, Proceedings of the 2000 conference of the Centre for Advanced Studies on Collaborative research, p. 1-15.*

(Continued)

*Primary Examiner* — Thuy Dao
*Assistant Examiner* — Stephen Berman
(74) *Attorney, Agent, or Firm* — Haynes and Boone, LLP

(57) ABSTRACT

A system and method of managing immutable objects includes monitoring new object construction, detecting construction of an object, determining a key for the object, looking the key up in a persistent storage system, when the key is found in the persistent storage system, loading the object from the persistent storage system, and when the key is not found in the persistent storage system constructing the object, determining whether the object is immutable, and storing the object in the persistent storage system when the object is immutable. In some examples, determining whether the object is immutable includes examining each primitive type data member of the object, examining each reference type constructor parameter of the object to determine whether the reference type constructor parameter is defensively copied, examining all function calls used by the object to determine whether the function calls preserve immutability, and recursively examining each reference type data member of the object.

18 Claims, 4 Drawing Sheets

(56) References Cited

U.S. PATENT DOCUMENTS

| | | | |
|---|---|---|---|
| 2009/0293045 A1* | 11/2009 | Cheriton | 717/136 |
| 2009/0319615 A1* | 12/2009 | Caunter et al. | 709/206 |
| 2011/0004866 A1* | 1/2011 | Frost | 717/116 |
| 2011/0161680 A1* | 6/2011 | Grube et al. | 713/193 |
| 2012/0254842 A1* | 10/2012 | Henderson | 717/136 |
| 2014/0123118 A1* | 5/2014 | Goetz et al. | 717/140 |
| 2014/0282615 A1* | 9/2014 | Cavage et al. | 719/316 |

OTHER PUBLICATIONS

Conradi et al., "Version models for software configuration management," 1998, ACM Computing Surveys (CSUR), vol. 30 Issue 2, pp. 232-282.*

Wiebe, "A distributed repository for immutable persistent objects," 1986, ACM SIGPLAN Notices—Proceedings of the 1986 conference on Object-oriented programming systems, languages, and applications, vol. 21 Issue 11, pp. 453-465.*

Efficient Web Services Response Caching by Selecting Optimal Data Representation, http://129.34.20.3/trl/people/mich/pub/200403_icdcs2004.pdf, Proceedings of the 24$^{th}$ International Conference on Distributed Computing Systems (ICDCS'04) 2004, 10 pages.

Oracle9i Application Server: Best Practices, http://citeseerx.ist.psu.edu/viewdoc/download?doi=10.1.1.131.2909&rep-rep1&type-pdf, Jun. 2002.

* cited by examiner

SYSTEM AND METHOD FOR MANAGING IMMUTABLE OBJECTS

BACKGROUND

The present disclosure relates generally to computing systems, and more particularly to managing immutable objects.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computing systems generally rely on one or more software components to deliver the services and information required by users and other systems. In order to deploy a software component for use, the computing system running the software component initializes the software component. In many cases this initialization involves the construction of one or more objects that are to be manipulated by the software component. In some examples, the construction of the one or more objects may be a lengthy and time-consuming task.

Accordingly, it would be desirable to provide improved methods and systems for constructing objects used by software components.

SUMMARY

According to one embodiment, a method of managing immutable objects includes monitoring new object construction, detecting construction of an object, determining a key for the object, looking the key up in a persistent storage system, when the key is found in the persistent storage system, loading the object from the persistent storage system, and when the key is not found in the persistent storage system constructing the object, determining whether the object is immutable, and storing the object in the persistent storage system when the object is immutable.

According to another embodiment, a non-transitory machine-readable medium comprising a first plurality of machine-readable instructions which when executed by one or more processors associated with one or more computing systems are adapted to cause the one or more processors to perform a method including monitoring new object construction, detecting construction of an object, determining a key for the object, looking the key up in a persistent storage system, when the key is found in the persistent storage system, loading the object form the persistent storage system, and when the key is not found in the persistent storage system constructing the object, determining whether the object is immutable, and storing the object in the persistent storage system when the object is immutable.

According to yet another embodiment, a system for managing immutable objects includes memory for storing an application server and a virtual machine, one or more processors coupled to the memory for executing the application server and the virtual machine, and a persistent storage system. The virtual machine monitors new object construction, detects construction of an object, determines a key for the object, looks the key up in the persistent storage system, when the key is found in the persistent storage system, loads the object from the persistent storage system, and when the key is not found in the persistent storage system constructs the object, determines whether the object is immutable, and stores the object in the persistent storage system when the object is immutable. To determine whether the object is immutable, the virtual machine examines each primitive type data member of the object, examines each reference type constructor parameter of the object to determine whether the reference type constructor parameter is defensively copied, examines all function calls used by the object to determine whether the function calls preserve immutability, and recursively examines each reference type data member of the object.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
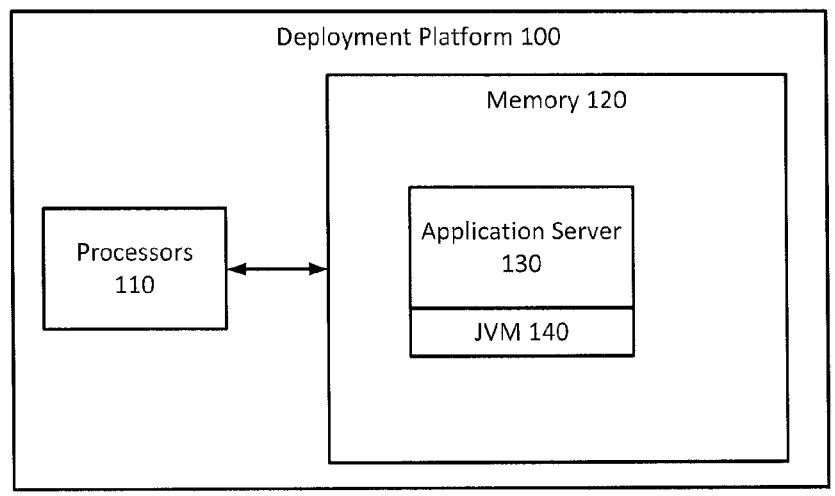
FIG. 1 is a simplified diagram of a deployment platform according to some examples.

FIG. 1 is a simplified diagram of a deployment platform 100 according to some examples. As shown in FIG. 1, deployment platform 100 may be the target system on which a software component is intended to be executed. In some examples, deployment platform 100 may be a standalone workstation, a cluster, a production server, within a virtual machine, and/or the like. Deployment platform 100 includes one or more processors 110 and memory 120. The one or more processors 110 are coupled to memory 120. In some examples, the one or more processors 110 may control operation and/or execution of software components on deployment platform 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 120 may further be used to store an application server 130 and/or a Java virtual machine (JVM) 140. In some examples, application server 130 may include a web server. In some examples, application server 130 may be selected from any commercially available application server including JBoss, WebSphere, WildFly, .NET framework, and the like. JVM 140 is a virtual machine capable of executing complied Java code. In some examples, application server 130 and/or JVM 140 may collectively include several components for managing, loading, and executing software components written in the Java language. In some examples, application server 130 and/or JVM 140 may be used to deploy and/or execute software projects contained in archive files. In some examples, the archive files may be Java archive (JAR) files, web archive (WAR) files, enterprise archive (EAR) files, and the like.

Figure 2:
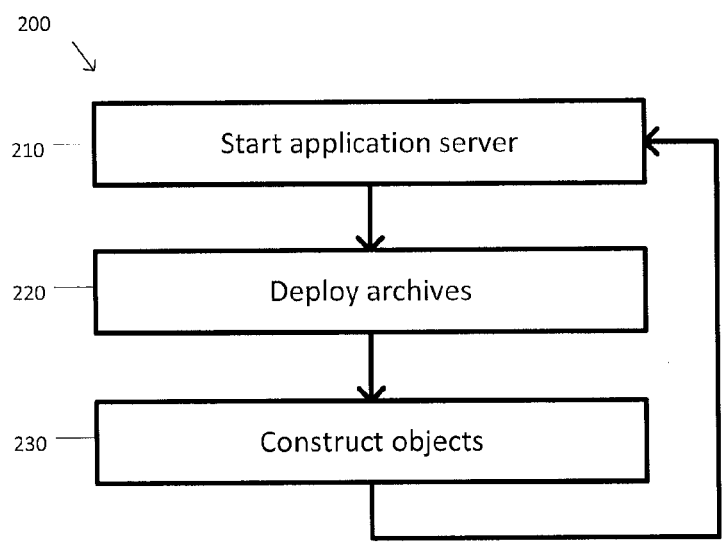
FIG. 2 is a simplified diagram of a method of deploying software components according to some examples.

FIG. 2 is a simplified diagram of a method 200 of deploying software components according to some examples. As shown in FIG. 2, the method 200 includes a process 210 for starting an application server, a process 220 for deploying archives, and a process 230 for constructing objects. According to certain examples, the method 200 of deploying software components can be performed using variations among the processes 210-230 as would be recognized by one of ordinary skill in the art. In some examples, one or more of the processes 210-230 of method 200 may be implemented, at least in part, in the form of executable code stored on non-transient, tangible, machine readable media that when run by one or more processors (e.g., the one or more processors 110) may cause the one or more processors to perform one or more of the processes 210-230.

At the process 210, an application server is started. In some examples, the application server may be started on a deployment platform. In some examples, the deployment platform may be deployment platform 100 and the application sever may be application server 130. In some examples, the application server may be restarted. In some examples, starting the application server may also start a virtual machine. In some examples, the virtual machine may be JVM 140.

At the process 220, archives are deployed. After the application server starts during process 210, one or more software components may be deployed on the application server from corresponding archives. In some examples, the archives may include JAR files, WAR files, EAR files, and the like. In some examples, each of the archives may correspond to a service hosted on the deployment platform. In some examples, as the archives are deployed, the corresponding software components begin to execute. In some examples, the software components may also be initialized.

At the process 230, objects are constructed. As each archive is deployed during process 220, software objects may be constructed as part of the initialization process. As part of the construction process for each of the software projects, one or more lines of code may be executed that initialize fields, variables, and/or other objects within the software objects. In some examples, the fields may be data members of the respective objects. In some examples, the fields may be member variables of the respective objects.

According to certain examples, method 200 may be repeated in whole or in part. In some examples, method 200 may be repeated when the application server is restarted. In some examples, processes 220 and 230 may be repeated when an archive is redeployed and/or when an additional archive is deployed on the application server.

According to certain examples, method 200 may be time consuming. In some examples, construction of the objects during process 230 may involve execution of many lines of code as some objects may include many fields that involve extensive construction. In some examples, objects written in languages such as Java may often be immutable. An immutable object is an object that cannot be modified after it is constructed using normal programming practices. As an example, all objects of type String in the Java language are immutable, meaning these objects may not be modified after they are constructed. In some examples, during deployment and execution many immutable objects may be constructed. In some examples, if copies of each of the many immutable objects are archived it may improve performance of the application server to find and load an immutable object from an archive rather than reconstruct the immutable object each time it is needed. In some examples, this may significantly improve performance of the application server during a restart and/or a redeployment of an archive when large numbers of immutable objects are to be constructed.

Figure 3:
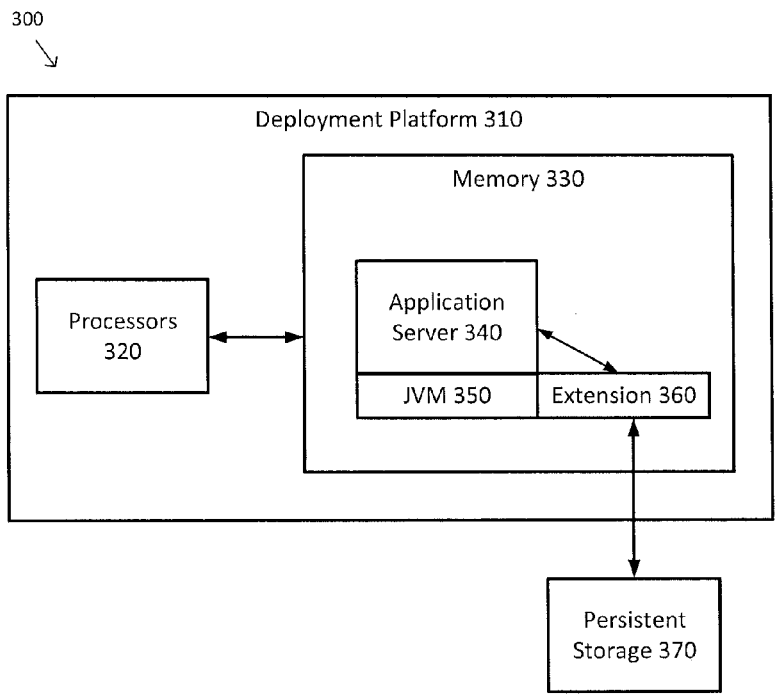
FIG. 3 is a simplified diagram of a system for managing immutable objects according to some examples.

FIG. 3 is a simplified diagram of a system 300 for managing immutable objects according to some examples. As shown in FIG. 3, system 300 includes a deployment platform 310. Deployment platform 310 may be the target system on which a software component is intended to be executed. In some examples, deployment platform 310 may be a standalone workstation, a cluster, a production server, within a virtual machine, and/or the like. Deployment platform 310 includes one or more processors 320 and memory 330. The one or more processors 320 are coupled to memory 330. In some examples, the one or more processors 320 may control operation and/or execution of software components on deployment platform 310. Memory 330 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 330 may further be used to store an application server 340, a Java virtual machine (JVM) 350, and an extension 360. In some examples, application server 340 may include a web server. In some examples, application server 340 may be an enhanced version of application server 130. JVM 350 is a virtual machine capable of executing complied Java code. In some examples, JVM 350 may be an enhanced version of JVM 140. In some examples, extension 360 may be an extension to application server 340 and/or JVM 350. In some examples, extension 360 may be coupled to application server 340 and/or JVM 350. In some examples, application server 340, JVM 350, and/or extension 360 may collectively include several components for managing, loading, and executing software components written in the Java language. In some examples, application server 340, JVM 350, and/or extension 360 may be used to deploy and/or execute software projects contained in archive files. In some examples, the archive files may be JAR files, WAR files, EAR files, and the like.

In some examples, extension 360 may be used to detect immutable objects as the immutable objects are constructed by application server 340 and/or JVM 350. In some examples, as extension 360 detects construction of immutable objects, extension 360 may archive copies of the immutable objects in persistent storage 370. In some examples, when extension 360 detects a request to construct a previously archived immutable object, extension 360 may load the immutable object from persistent storage 370 so that the immutable object does not need to be reconstructed.

Persistent storage 370 may be used to archive one or more immutable objects for later use. In some examples, persistent storage 370 may include any kind of non-volatile memory. In some examples, the non-volatile memory may include floppy disk, flexible disk, hard disk, magnetic tape, any other magnetic medium, any kind of rewritable optical medium, FLASH, EEPROM, and/or any other non-volatile medium from which a processor or computer is adapted to read. In some examples, persistent storage 370 may include a database server. In some examples, the database server may be a NoSQL database server. In some examples, persistent storage 370 may include any storage mechanism capable of storing data in key-value pairs. In some examples, each of the stored key value pairs may include a key and a value where the key corresponds to an immutable object that is identified by the key. In some examples, persistent storage 370 may be a persistent storage system.

As shown in FIG. 3, persistent storage 370 is shown separate from deployment platform 310, but many different arrangements are possible for persistent storage 370. In some examples, persistent storage 370 may be coupled to deployment platform and extension 360 using a network. In some examples, deployment platform 310 may include persistent storage 370. In some examples, memory 330 may include persistent storage 370.

Figure 4:
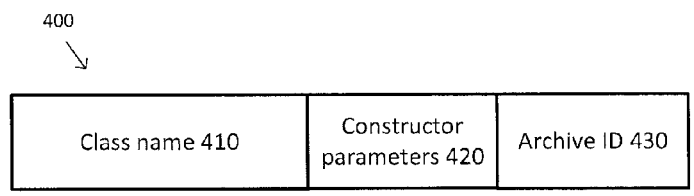
FIG. 4 is a simplified diagram of a key for identifying immutable objects according to some examples.

FIG. 4 is a simplified diagram of a key 400 for identifying immutable objects according to some examples. As shown in FIG. 4, key 400 includes a class name 410, constructor parameters 420, and an archive identifier (ID) 430. In some examples, key 400 should include sufficient information to uniquely identify an immutable object. In some examples, key 400 may be used to index persistent storage containing one or more objects. In some examples, the persistent storage may be persistent storage 370.

Class name 410 may be used to identify a class of the immutable object. In some examples, the class name 410 may be a full canonical class name for the class of the immutable object. In some examples, class name 410 may be used determine a type of the immutable object.

Constructor parameters 420 may be used to record parameters used by a constructor that constructed the immutable object. An immutable object constructed with the same parameters should result in a same value each time it is constructed. In some examples, many classes include multiple constructors, each with many parameters. In some examples, the constructor used to construct the immutable object may be identified by a number and type of the constructor parameters. In some examples, the constructor parameters 420 may include a serialized version of the parameters used by the constructor that constructed the immutable object.

Archive ID 430 may include an identifier for an archive for which the immutable object is being constructed. In some examples, archive ID 430 may include a name of the archive. In some examples, archive ID 430 may include a version of the archive because different versions of archives may construct the immutable object in different ways.

Figure 5:
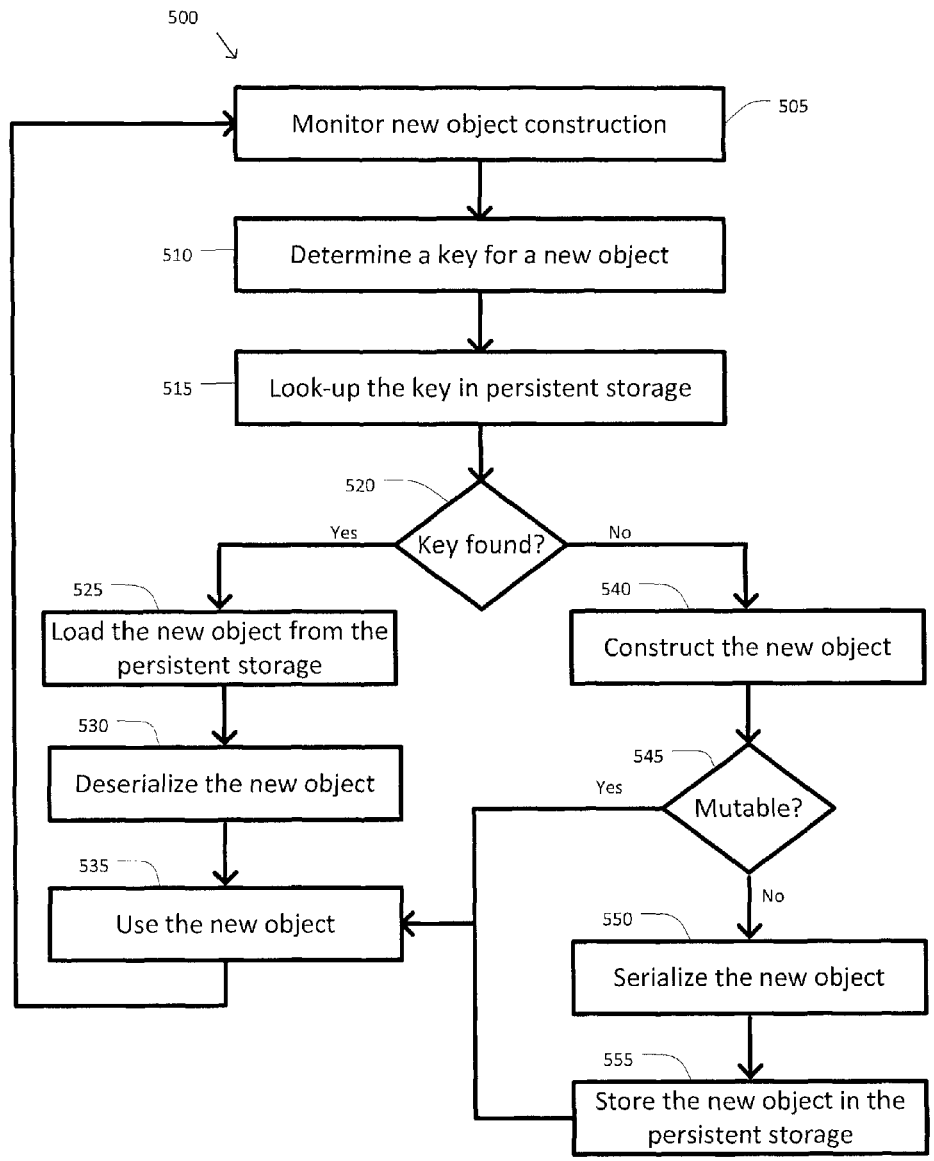
FIG. 5 is a simplified diagram of a method of managing immutable objects according to some examples.

FIG. 5 is a simplified diagram of a method 500 of managing immutable objects according to some examples. As shown in FIG. 5, the method 500 includes a process 505 for monitoring new object construction, a process 510 for determining a key for a new object, a process 515 for looking the key up in persistent storage, a process 520 for determining whether the key is found, a process 525 for loading the new object from the persistent storage, a process 530 for deserializing the new object, a process 535 for using the new object; a process 540 for constructing the new object, a process 545 for determining whether the new object is mutable, a process 550 for serializing the new object, and a process 555 for storing the new object in persistent storage. According to certain examples, the method 500 of managing immutable objects can be performed using variations among the processes 505-555 as would be recognized by one of ordinary skill in the art. In some examples, one or more of the processes 505-555 of method 500 may be implemented, at least in part, in the form of executable code stored on non-transient, tangible, machine readable media that when run by one or more processors (e.g., the one or more processors 320) may cause the one or more processors to perform one or more of the processes 505-555. According to certain examples, method 500 may be performed as part of an enhanced version of process 230.

At the process 505, new object construction is monitored. As archives are being deployed, many objects get constructed. By monitoring when objects are constructed it is possible to take advantage of previously constructed immutable objects. In some examples, new object construction may be monitored by using an extension (e.g., extension 360) to a JVM (e.g., JVM 350). In some examples, new object construction may be performed by a new operator. The new operator is often used in a software component to perform the construction of a new object by using a corresponding constructor and construction parameters. As an example, an object of type Point may be constructed using a line of software similar to "Point origin=new Point(0.0, 0.0);" In this examples, the new operator is used to execute a constructor for the Point class that uses an x and a y coordinate specified using floating point numbers to create a new object of type Point with x and y coordinates of (0.0, 0.0). In an unextended JVM, the new object would be constructed using the corresponding constructor and parameters by executing the code in the corresponding constructor. In some examples, by using the extension to the JVM, the behavior of the new operator may be augmented to perform method 500.

At the process 510, a key is determined for a new object. Once construction of a new object is detected during process 505, a key is determined for the new object. In some examples, a corresponding usage of the new operator is examined to determine a type of the new object and constructor parameters for the new object. In some examples, the type of the new object may be determined from a class name associated with the type. In some examples, the extension may determine an archive associated with the new object by obtaining an archive ID from an application server (e.g., application server 340). Using the type, the constructor parameters, and the archive ID, the key for the new object may be determined. In some examples, the key for the new object may be consistent with key 400.

At the process 515, the key is looked-up in persistent storage. Persistent storage, such as persistent storage 370 is searched to determine whether an immutable object with a matching key is already stored in the persistent storage. In some examples, the persistent storage may be indexed using keys such as the key determined during process 510. In some examples, the look-up may be performed using a database query. In some examples, the look-up may be performed by matching the key to key-value pairs stored in the persistent storage.

At the process 520, it is determined whether the key is found. Based on the look-up performed during process 515, it is determined whether the key is found in the persistent storage. When the key is found in the persistent storage, an immutable object corresponding to the key is also stored in the persistent storage. In some examples, the key may be found when results of the database query performed during process 515 are non-empty. In some examples, the key may be found when a matching key-value pair is located in the persistent storage. By recovering the corresponding immutable object from the persistent storage it is possible to avoid having to reconstruct the new object because the new object should be equivalent to the corresponding immutable object. When the key is found in the persistent storage, the new object may be loaded from the persistent storage using process 525. When the key is not found in the persistent storage, the new object is constructed using process 540.

At the process 525, the new object is loaded from the persistent storage. Using the key for the new object determined during process 510, the new object is loaded from the persistent storage. In some examples, the new object may be included in the results of the database query performed during process 515. In some examples, the new object may be included in the matching key-value pair found in the persistent storage during process 515.

At the process 530, the new object is deserialized. In some examples, the new object loaded during process 525 is in serialized form and needs to be deserialized before it may be used in the software component. In some examples, deserialization includes inflating and/or unmarshalling the new object.

At the process 535, the new object is used. The new object may now be used by the software component. Once the new object is in use, the extension may continue to monitor further new object construction using process 505.

At the process 540, the new object is constructed. When the new object is not found in the persistent storage, the new object is constructed. In some examples, the new object may not be found in the persistent storage when the new object has never been previously constructed. In some examples, the new object may not be found in the persistent storage when the new object is mutable. The new object may be constructed by executing the code of the corresponding constructor and the constructor parameters.

At the process 545, it is determined whether the new object is mutable. Objects should be stored in persistent storage only when they are immutable. By limiting the persistent storage to immutable objects, this helps ensure that when new objects are loaded from the persistent storage that the loaded objects are the same as the new objects would be when constructed using the regular construction process. When the new object is mutable, the new object is used using process 535. When the new object is immutable, the new object is added to the persistent storage beginning with process 550.

Figure 6:
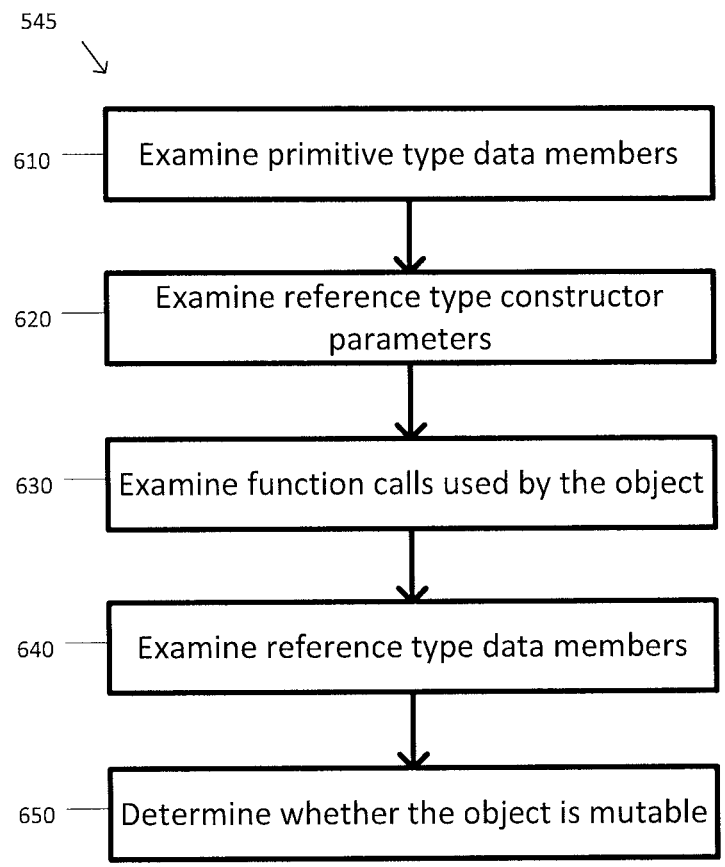
FIG. 6 is a simplified diagram of a process for determining whether an object is mutable according to some examples.

FIG. 6 is a simplified diagram of the process 545 for determining whether an object is mutable according to some examples. As shown in FIG. 6, the process 545 includes a process 610 for examining primitive type data members, a process 620 for examining reference type constructor parameters, a process 630 for examining function calls used by the object, a process 640 for examining reference type data members, and a process 650 for determining whether the object is immutable. According to certain examples, the process 545 of determining whether the object is mutable can be performed using variations among the processes 610-650 as would be recognized by one of ordinary skill in the art. In some examples, one or more of the processes 610-650 of process 545 may be implemented, at least in part, in the form of executable code stored on non-transient, tangible, machine readable media that when run by one or more processors (e.g., the one or more processors 320) may cause the one or more processors to perform one or more of the processes 610-650. In some examples, the process 545 may require access to source code for a class of the object being analyzed.

At the process 610, primitive type data members are examined. Most objects include one or more fields that may be used to store data associated with the objects. These fields are often referred to as data members or member variables. In some examples, these data members often fall into two types, those which are of primitive type and those which are of reference type. Primitive type data members are data members that are typically stored within the object itself. In some examples, the primitive types correspond to data types that may be stored by value in registers and/or other hardware. In some examples, the primitive types may include byte, short, int, long, float, double, char, boolean, and the like. In contrast, reference type data members are data members that are typically stored using references and/or pointers within the object itself. In some examples, most objects in languages such as Java may be reference types. In some examples, many objects in languages such as Java often include data members of primitive type.

Each of the data members of primitive type should be examined to determine whether they are immutable. In some examples, software developers may indicate whether a data member of primitive type is immutable by designating it was a special keyword. In some examples, the special keyword is "final." In some examples, when a data member is designated as final, once the data member is initialized, the data member cannot be changed using normal programming practices, thus making the data member immutable.

The data members of the object may also be altered by one or more member functions and/or methods of the object. When a non-final primitive type data member can be altered through use of a member function and/or method with a "public" designation then immutability of the object cannot be guaranteed because a call to that member function and/or method may result in changes being made to that data member. In some examples, the member functions should also be evaluated recursively. Thus, any non-final primitive type data member that is changed by a "public" member function designates the object as mutable.

In some examples, even final primitive type data members may result in a mutable object for the purposes of methods, such as method 500. In some examples, primitive type data members may be initialized using non-deterministic methods. In some examples, the non-deterministic methods may include methods based on randomness, time, input/output, and the like. In some examples, a finite list of non-deterministic methods may be used when examining the primitive type data members. Final primitive type data members that are initialized with non-deterministic methods are considered to be mutable, thus making the object mutable.

At the process 620, reference type constructor parameters are examined. In some examples, objects may often be constructed using constructor parameters that are reference types. Because reference type parameters are provided by reference, any change made to the referenced parameter by other parts of the software component may result in a change to the object that references that referenced parameter. In some examples, this is because the object may record only the reference and so it still references (i.e., points to) the parameter. In some examples, this issue may be addressed when the construction process makes a defensive copy of the reference type parameter. When a defensive copy is made, the object referenced by the reference type parameter is copied and/or cloned and the copy is used so that changes made to the object referenced by the reference type parameter will not affect the copy within the object. In some examples, this is not a concern for primitive type constructor parameters because they are typically provided by value, which are copied when they are used. When a reference type constructor parameter is not defensively copied before use, the object is considered to be mutable.

At the process 630, function calls used by the object are examined. Any functions called by member functions of the object should also be examined to determine whether they support immutability. In some examples, examination of the function calls may further support the examinations performed during processes 610 and/or 620. In some examples, when the source code of a function being called is available, that function may be examined to determine whether it makes mutable changes to the object. In some examples, process 630 may be applied recursively to any functions being called by the functions being examined. In some examples, when the source code for a called function is not available, the function call may be presumed by default to make the object mutable. In some examples, a reserved keyword may be used to tag a function as immutable. In some examples, the reserved keyword may be "@Immutable." In some examples, when the function being called is tagged as immutable, the default presumption may be overcome and the function may be assumed to preserve immutability of the object.

At the process 640, reference type data members are evaluated. In order for an object to be immutable, all the data members of the object should also be immutable. Immutability of reference type data members may be examined by recursively applying process 545 to each of the reference type data members. When any of the reference type data members are mutable then the object including them is also considered to be mutable.

At the process 650, it is determined whether the object is mutable. When any of the examinations performed during processes 610-640 determine that a primitive type data member, a reference type constructor parameter, a function call, and/or a reference type data member indicate that the object is mutable then it is determined that the object is mutable. When all of the examinations performed during processes 610-640 indicate that immutability is preserved, then it may be determined that the object is immutable.

According to certain examples, processes 610-650 may be overly cautious in determining that that object is mutable when it may actually be immutable. In some examples, this may reduce the performance gains of methods, such as method 500, which rely on this determination. In some examples, an overly cautious determination may be preferred to a determination that inaccurately determines that a mutable object is an immutable object, because subsequent use of a stored copy of a mutable object may result in an incorrect object being provided for use.

Referring back to FIG. 5, at the process 550, the new object is serialized. The new object constructed during process 540 is converted to a serialized form. Serialization may be used to convert objects into a form that is more easily stored. In some examples, serialization includes deflating and/or marshaling the new object.

At the process 555, the new object is stored in the persistent storage. The new object serialized during process 540 is associated with the key determined during process 510. The new object and the key are then stored in the persistent storage. In some examples, the new object and the key are stored using a database update. In some examples, a key-value pair corresponding to the key and the new object is stored in the persistent storage. In some examples, the stored new object may be accessed later using processes 515 and/or 525 when another immutable object with a matching key needs to be constructed. After storing the new object in the persistent storage, the object may be used using process 535.

Some examples of deployment platform 100 and/or 310 may include non-transient, tangible, machine readable media that include executable code that when run by one or more processors (e.g., processor 110 and/or 320) may cause the one or more processors to perform the processes of methods 200 and/or 500 as described above. Some common forms of machine readable media that may include the processes of methods 200 and/or 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of managing immutable objects, the method comprising:
   monitoring new object construction;
   detecting construction of an object;
   determining a key for the object;
   looking the key up in a persistent storage system;
   when the key is found in the persistent storage system, loading the object from the persistent storage system; and
   when the key is not found in the persistent storage system:
     constructing the object;
     determining whether the object is immutable; and
     storing the object in the persistent storage system when the object is immutable;
   wherein determining whether the object is immutable comprises:
     examining each primitive type data member of the object;

examining each reference type constructor parameter of the object to determine whether the reference type constructor parameter is defensively copied;
examining all function calls used by the object to determine whether the function calls preserve immutability; and
recursively examining each reference type data member of the object.

2. The method of claim 1 wherein monitoring new object construction comprises monitoring new object construction in a virtual machine.

3. The method of claim 2 wherein the virtual machine is an extended Java virtual machine.

4. The method of claim 1, further comprising deserializing the object after loading the object from the persistent storage system.

5. The method of claim 1, further comprising serializing the object before storing the object in the persistent storage system.

6. The method of claim 1 wherein the key comprises a class name associated with the object, parameters of a constructor used to construct the object, and an archive identifier associated with the object.

7. The method of claim 6 wherein the constructor parameters are serialized.

8. The method of claim 1 wherein looking the key up in the persistent storage system comprises querying a database.

9. The method of claim 1 wherein monitoring new object construction comprises using an augmented new operator.

10. The method of claim 1 wherein looking the key up in the persistent storage system comprises matching the key against one or more key-value pairs stored in the persistent storage system.

11. The method of claim 1 wherein the persistent storage system stores one or more key-value pairs wherein a value in each key-value pair corresponds to an immutable object identified by a corresponding key in the key-value pair.

12. The method of claim 1 wherein examining each primitive type data member of the object comprises:
determining whether the primitive type data member is designated as final;
determining whether the primitive type data member is altered as a result of a call made to a public member function of the object; and
determining whether the primitive type data member is initialized using a non-deterministic method.

13. A non-transitory machine-readable medium comprising a first plurality of machine-readable instructions which when executed by one or more processors associated with one or more computing systems are adapted to cause the one or more processors to perform a method comprising:
monitoring new object construction;
detecting construction of an object;
determining a key for the object;
looking the key up in a persistent storage system;
when the key is found in the persistent storage system, loading the object from the persistent storage system; and
when the key is not found in the persistent storage system:
constructing the object;
determining whether the object is immutable; and
storing the object in the persistent storage system when the object is immutable;
wherein determining whether the object is immutable comprises:
examining each primitive type data member of the object;
examining each reference type constructor parameter of the object to determine whether the reference type constructor parameter is defensively copied;
examining all function calls used by the object to determine whether the function calls preserve immutability; and
recursively examining each reference type data member of the object.

14. The non-transitory machine-readable medium of claim 13 wherein examining each primitive type data member of the object comprises:
determining whether the primitive type data member is designated as final;
determining whether the primitive type data member is altered as a result of a call made to a public member function of the object; and
determining whether the primitive type data member is initialized using a non-deterministic method.

15. A system for managing immutable objects, the system comprising:
memory for storing an application server and a virtual machine;
one or more processors coupled to the memory for executing the application server and the virtual machine; and
a persistent storage system;
wherein the virtual machine:
monitors new object construction;
detects construction of an object;
determines a key for the object;
looks the key up in the persistent storage system;
when the key is found in the persistent storage system, loads the object from the persistent storage system; and
when the key is not found in the persistent storage system:
constructs the object;
determines whether the object is immutable; and
stores the object in the persistent storage system when the object is immutable;
wherein to determine whether the object is immutable, the virtual machine:
examines each primitive type data member of the object;
examines each reference type constructor parameter of the object to determine whether the reference type constructor parameter is defensively copied;
examines all function calls used by the object to determine whether the function calls preserve immutability; and
recursively examines each reference type data member of the object.

16. The system of claim 15 wherein the virtual machine is an extended Java virtual machine.

17. The system of claim 15 wherein the persistent storage system comprises a database.

18. The system of claim 15 wherein the persistent storage system stores one or more key-value pairs wherein a value in each key-value pair corresponds to an immutable object identified by a corresponding key in the key-value pair.

* * * * *